UNITED STATES PATENT OFFICE.

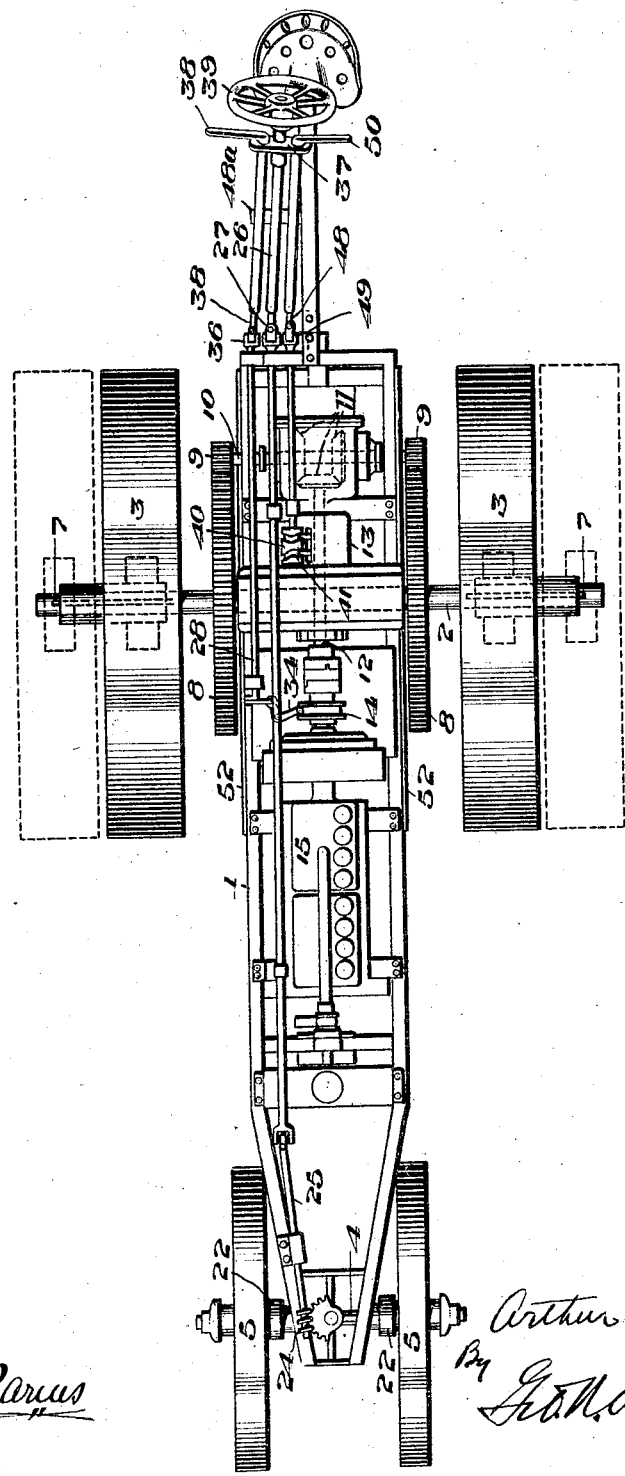

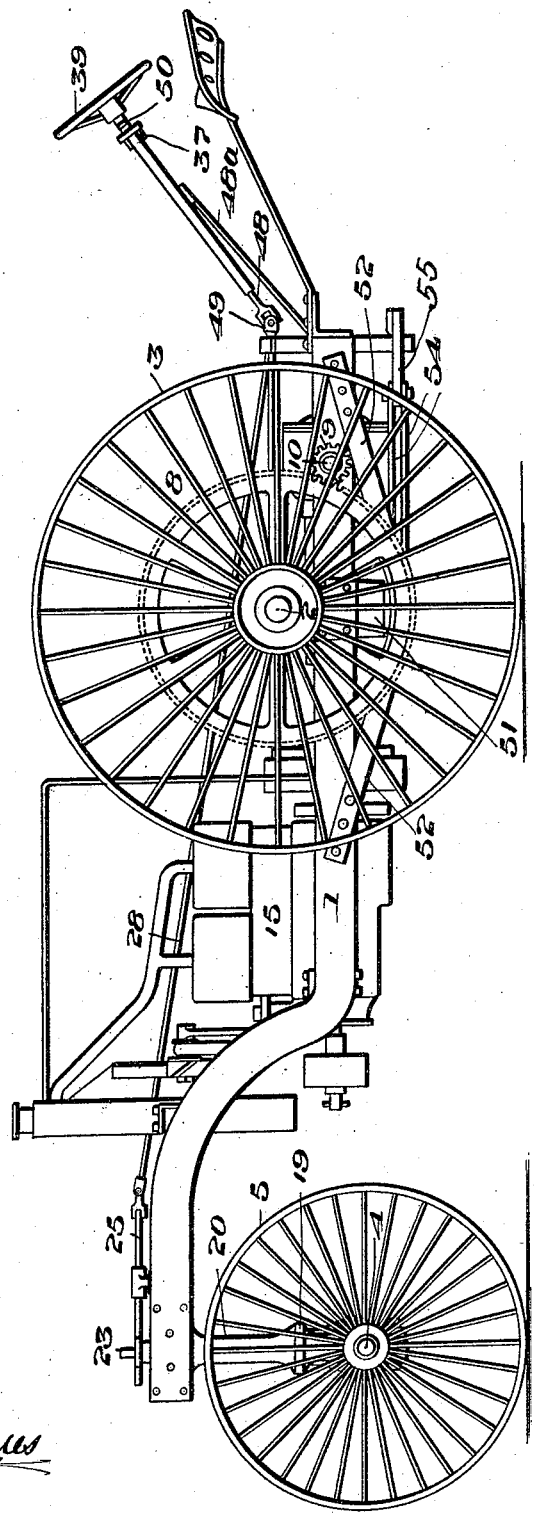

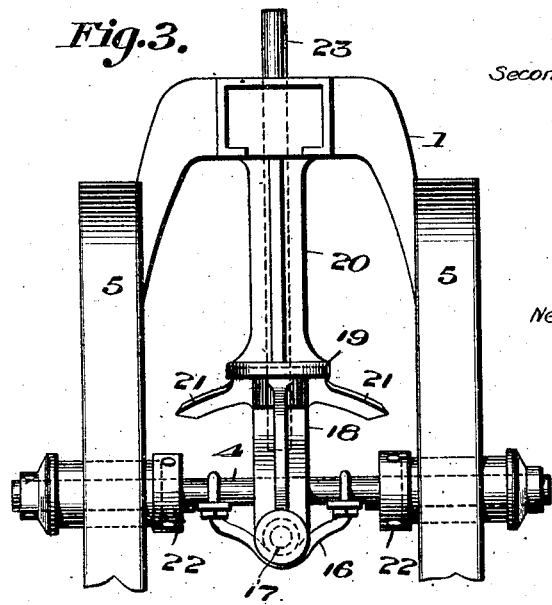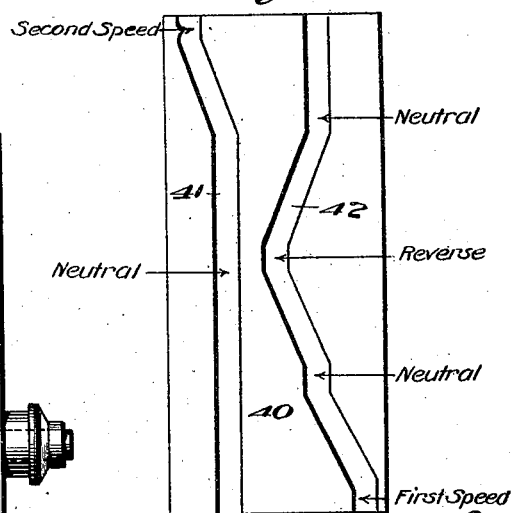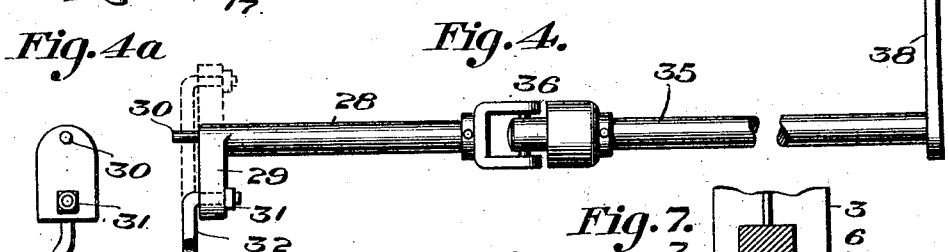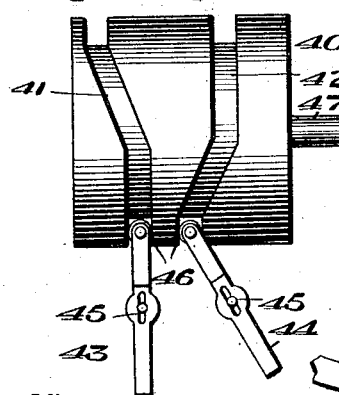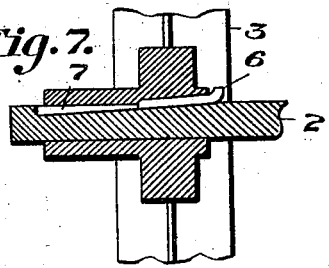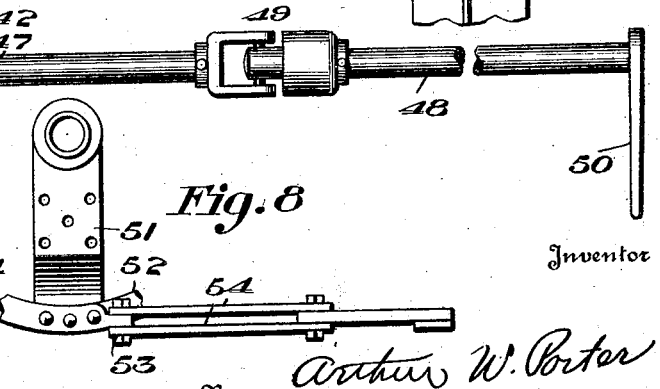

ARTHUR W. PORTER, OF COLFAX, IOWA.

TRACTION ENGINE.

1,419,689.  Specification of Letters Patent.  Patented June 13, 1922.

Application filed December 2, 1916, Serial No. 134,600. Renewed October 31, 1921. Serial No. 511,841.

*To all whom it may concern:*

Be it known that I, ARTHUR W. PORTER, a citizen of Canada, residing at Colfax, county of Jasper, and State of Iowa, have invented certain new and useful Improvements in Traction Engines, of which the following is a specification.

This invention relates to traction engines. One of my objects is the provision, in a traction engine, of driving gears arranged and cooperating with the drive shaft or axle in an improved manner so that the traction or ground wheels may be moved to different positions along the main shaft or axle to meet the requirements of intensive farming in plowing and cultivating rowed crops of any width. The bull gears which I secure to the main axle, do not have to be shifted when the traction or ground wheels are moved different distances from each other, and consequently, I am enabled to compactly arrange the driving gears and to completely house them in gear casings so that they may run in oil, if desired, and all foreign matter is thus excluded from them. The ground or traction wheels may be secured at different points lengthwise of the main axle by releasing the keys that hold them and, after placing the traction wheels in the desired positions, again driving the keys home.

Another object is the provision of a novel arrangement of steering wheel stem, clutch control stem, and gear shift stem, whereby these three controlling devices may be shifted to different angular positions according to the requirements of the operator and whether he is occupying a seat on the traction engine or on some agricultural machine which is being drawn by the traction engine. Suitable support is provided for the controlling devices. Universal joints connect the controlling stems aforesaid to the shafts which they operate. These stems may be formed of telescopic sections so that they can be adjusted lengthwise as well as shifted up or down or sidewise to any desired position.

A further object is to provide a transmission gear shifting device of improved construction and manner of cooperation with the gears of the transmission, whereby they may be placed in neutral position at first speed; reverse position; and second speed by a slight extent of movement of the controlling device for the gear shift. My improved gear shift cylinder having cam grooves adapted to cooperate with the gear shifting levers, is so arranged that by rotating the cylinder but three-quarters of a complete turn, the different controls may be conveniently obtained by the use of the controlling stem heretofore described.

Another object is to provide a novel clutch operating device adapted for control by its stem heretofore described, which, by a very slight movement, renders it possible to throw a clutch lever to a given position and to throw out the clutch and hold it in locked-out position, thus enabling the operator to hold the clutch out of lock condition without requiring any attention while he leaves his seat on the machine.

A still further object is to provide novel means for the steering wheels so as to prevent them from rising or falling to an angle greater than that at which gravity overcomes traction. This angle, as generally ascertained, is approximately 30 degrees. I provide stop devices arranged to cooperate with a pivoted truck or axle which carries the front steering wheels so that the up and down swing of these wheels is limited in such manner as to prevent either wheel, when travelling over uneven surfaces, from falling into a depression greater than that of say, a 30 degree angle and I thus present the machine from skidding and overcome a fault which has heretofore been very common in traction engines. The steering wheels being, say, twenty-five inches apart, and the furrows being, say, only fourteen to sixteen inches in width, it will be impossible for both steering wheels to drop into the furrow at the same time. On a forty inch wheel, a furrow of four inches in depth equals the 30 degree angle set forth. In going over a furrow of a greater depth than four inches, the companion steering wheel automatically takes the traction weight by virtue of the engagement of the stop devices, which consist of a stop bracket and a stop collar, and the steering wheel crossing the furrow "idles" until it reaches the traction surface at such an angle as will enable it to roll. By the provision of these improvements in the steering gear, my traction engine will run in a true circle over a series of furrows of varying depths and without varying from its course, while being without a driver at the steering hand-wheel.

Other objects of the invention will appear more fully from the following description and from the disclosure in the accompanying drawings, but as the invention is susceptible of modification, the disclosure is to be considered as illustrative, rather than restrictive, of the scope of the invention.

In the accompanying drawings:

Figure 1, is a plan view, dotted lines representing a changed position of the wheels;

Fig. 2, a side elevation;

Fig. 3, a front view of the steering wheels, certain parts being broken away and other parts detached;

Figs. 4 and 4ª, details of the clutch operating and locking means;

Fig. 5, a detail of the change gear operating means;

Fig. 6, a plotted view of the cylinder of Fig. 5;

Fig. 7, a detail of the means for securing the traction wheels; and

Fig. 8, a detail side elevation of a part of the draw bar.

The frame 1 is supported by main axle 2, traction drive wheels 3, front axle 4 and steering wheels 5.

The axle 2 is journaled in suitable bearings so that it will turn the wheels 3 which are keyed thereto by keys 6 adapted to be inserted in different parts of key seats 7. The ends of axle 2 project out on opposite sides of frame 1 for suitable distances to permit the wheels 3 to be shifted toward or away from each other, as indicated by dotted lines to adapt them to the width of the row being cultivated. To do this, the keys 6 are released, the wheels moved along the axle and the keys reset in the seats 7.

Fast on the axle 2 are the bull gears 8 which are driven by pinions 9 on counter-shaft 10.

The shaft 10 is driven by bevel gears 11 from engine shaft 12. Change speed gearing of any desired type is contained within case 13. Clutch 14 couples shafts 10 and 12. The engine 15 may be of any desired kind.

The axle 4 carries a bracket 16 by which it is pivoted or hinged at 17 to a turn table 18 in such manner that the axle can swing up and down on a horizontal, forwardly and rearwardly extending, axis. The turn table 18 bears against the bottom 19 of a pillar or column 20 which is integral with, and depends from, the forward end of frame 1. Ball or roller bearings may be interposed between the turn table 18 and pillar bottom 19. Carried by the turn table 18 are oppositely extending brackets 21. Secured on the axle 4 are stop collars 22 which are adapted to abut the brackets 21, one at a time, to limit the tilting of the axle 4. As gravity overcomes traction when an angle of 30 degrees is exceeded, I construct and arrange the brackets 21, and stop collars 22 so that they will contact, and prevent further tilting of axle 4 and steering wheels 5, before an angle of 30 degrees is exceeded with the result hereinbefore specified.

The steering shaft 23 extends down loosely through the pillar 20 and is keyed or otherwise suitably fastened in the turn table 18. Worm gearing 24, a shaft 25, and a steering stem 26 having a universal joint connection 27 with shaft 25, afford means for turning the axle 4 and wheels 5 to different positions to effect steering but without interfering with the freedom of the axle to swing up and down on the pivot hinge 17.

As shown in Figs. 1, 4, and 4ª, the clutch 14 is operated by a rock shaft 28 which has an arm 29 provided with a stop pin 30, there being pivoted to the arm 29 at 31, a link 32 which has a notched or offset portion 33 adapted to receive the stop pin when the clutch 14 is released, thus locking the clutch in open condition. A bell crank lever 34 constitutes an operative connection between the link 32 and clutch 14. A clutch release stem 35, having a universal joint connection 36 with shaft 28, is loosely journaled in a bracket 37 carried by stem 26 and its control handle 38 is located conveniently adjacent the steering wheel 39.

The change speed gears in case 13 are controlled by a cylinder 40, Figs. 5 and 6, having cam grooves 41 and 42 which are platted in Fig. 6, showing the points where first speed, its neutral and reverse occur and second speed and its neutral take place in controlling the gear shifting levers 43 and 44 which are pivoted at 45 and whose ends are received in the cam grooves at 46. The cylinder 40 is carried by a shaft 47 which is controlled by a stem 48 connected thereto by a universal joint 49; the stem is loosely journaled in bracket 37 and has a handle 50 disposed adjacent wheel 39.

The stems 26, 35, 48 may all be composed of telescopic sections so that they can be drawn out to any desired extent, or shut up, to position the respective controls conveniently to the operator, whether he be occupying a seat on the machine, or, a seat on any implement or machine being drawn by the tractor engine. Any suitable bracket 48ª may be used to support the stems 26, 35, 48 from the frame 1 or the frame of a machine drawn by the engine.

The depending frame pieces 51 are connected to the sides of the main frame at the center of trusses 52 and to them are pivoted at 53 the double links 54 of a laterally swinging bar which has the cross bar 55. The draw bar being below the axle 2 and frame 1, the draft increases the tractive effect of the wheels 3 and 5, when the load is applied, obviating the necessity of carrying excess weight thereon.

Having thus described my invention, what I claim as new and desire to secure by Letters Patent, is:—

1. In a wheeled vehicle, the combination with a vehicle frame, of a laterally disposed turn table on which said frame rests, and stop brackets carried by the turn table, an axle pivoted intermediate its ends on a stationary pivot carried by the turn table for free up and down tilting movements within certain predetermined limits, and steering wheels carried by the axle on opposite sides of its pivot, said stop brackets being adapted to serve as abutments to arrest the axel to limit the amplitude of the free up and down movement thereof.

2. In a wheeled vehicle, the combination with a vehicle frame, of a laterally disposed turn table on which the said frame rests, brackets carried by the turn table, an axle pivoted intermediate its ends on a stationary pivot carried by the turn table for free up and down tilting movements within certain predetermined limits, steering wheels carried by the axle on opposite sides of its pivot, and stop collars on the axle adapted to abut the respective stop brackets to limit the amplitude of the free up and down movement of the axle.

In testimony whereof, I hereunto affix my signature.

ARTHUR W. PORTER.